(12) United States Patent
Soliman

(10) Patent No.: US 6,687,501 B2
(45) Date of Patent: Feb. 3, 2004

(54) SYSTEM AND METHOD OF DYNAMICALLY CALIBRATING BASED STATION TIMING USING LOCATION INFORMATION

(75) Inventor: Samir S. Soliman, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 34 days.

(21) Appl. No.: 09/910,517

(22) Filed: Jul. 20, 2001

(65) Prior Publication Data

US 2002/0065089 A1 May 30, 2002

Related U.S. Application Data

(60) Provisional application No. 60/239,318, filed on Oct. 10, 2000.

(51) Int. Cl.$^7$ ................................................. H04Q 7/20
(52) U.S. Cl. ................ 455/424; 455/67.11; 455/67.14; 455/67.16; 455/561
(58) Field of Search ................................. 455/423, 424, 455/67.1, 561, 67.11, 67.14, 67.16; 370/335

(56) References Cited

U.S. PATENT DOCUMENTS 5,943,331 A * 8/1999 Lavean ....................... 370/335

FOREIGN PATENT DOCUMENTS

WO    WO 9956413    * 11/1999    ............ H04B/7/26

OTHER PUBLICATIONS

McCrady, et al. "Mobile Ranging with Low Accuracy Clocks", Radio and Wireless Conference 1999, pp. 85–88.

* cited by examiner

Primary Examiner—Nay Maung
Assistant Examiner—Philip J. Sobutka
(74) Attorney, Agent, or Firm—Philip Wadsworth; Charles Brown; Richard Bachand

(57) ABSTRACT

A system and method for dynamically calibrating a base station in a wireless communication system, is presented herein. In accordance with an embodiment of the invention, the system includes a base station for transmitting, receiving, and processing communication signals and a wireless communication device for communicating with the base station. The wireless communication device is configured to determine its location (e.g., using GPS information), to detect the arrival time of a first signal transmitted from the base station, and to calculate a line-of-sight (LOS) delay corresponding to the LOS distance between the wireless communication device and the base station. The LOS distance calculation is based on the base station location information and the wireless communication device location information. The base station measures a round trip delay (RTD) corresponding to the delay incurred by the first signal and a delay incurred by a second signal transmitted from the wireless communication device back to the base station in response to the first signal. The base station then determines a base station timing calibration error based on the LOS delay, the first signal arrival time, and the RTD, and dynamically calibrates the base station timing to compensate for the base station timing calibration error.

27 Claims, 5 Drawing Sheets

SYSTEM AND METHOD OF DYNAMICALLY CALIBRATING BASED STATION TIMING USING LOCATION INFORMATION

RELATED APPLICATIONS

This application claims priority to U.S. Provisional application Ser. No. 60/239,318, filed Oct. 10, 2000.

BACKGROUND OF THE INVENTION

1. Field of the Invention

The present invention relates in general to wireless communications systems and, in particular, to system and method for dynamically calibrating base station timing.

2. Description of Related Art and General Background

Calibrating and maintaining proper timing is an important concern in communication systems. This is particularly true in wireless communications operating under Code Division Multiple Access (CDMA) schemes. CDMA is a digital radio-frequency (RF) channelization technique, defined in Telecommunications Industry Association/Electronics Industries Association Interim Standard-95 (TIA/EIA IS-95), entitled "MOBILE STATION-BASE STATION COMPATIBILITY STANDARD FOR DUAL-MODE WIDEBAND SPREAD SPECTRUM CELLULAR SYSTEM", published in 1993. Other aspects of CDMA communication systems are defined in well-known standards, such as, for example, TLA/EIA IS-97, TIA/EIA IS-98, cdmaOne, cdma2000, and wideband CDMA (WCDMA) standards.

Wireless communication systems employing CDMA technologies assign a unique code to communication signals and apply pseudorandom noise (PN) modulation to spread these communication signals across a common wideband spread spectrum bandwidth. In particular, the communication signals are modulated with PN sequences to spread the signals over a wide bandwidth. CDMA systems employ two short PN code sequences (i.e., "I" and "Q") and one long PN code sequence. The short PN codes are used for quadrature spreading and have unique offsets serving as identifiers for a cell or a sector. At the WD 110 receiver, the received spread spectrum signal is despread in order to recover the original data. As long as the WD 110 receiver has the correct code, it can successfully detect and select its communication signal from the other signals concurrently transmitted over the same bandwidth. The encoding/decoding, modulation/demodulation, and spreading/despreading processes depend on accurate timing for synchronization and proper system operation.

FIG. 1 (Prior Art) illustrates a simplified block diagram of CDMA wireless communication system 100. System 100 allows mobile station or wireless communication device (WD) 110 to communicate with an Interworking Function (IWF) 108 via a base station (BS) 106. The IWF 108 serves as a gateway between the wireless network and other networks, such as the Public Switched Telephone Network (PSTN) and wireline packet data networks providing Internet- or Intranet-based access. WD 110 communicates with BS 106, which is associated with a geographic cell or sector, via the wireless interface $U_m$ on the reverse link transmission path. BS 106 is configured to process the communication signals from WD 110.

On the forward link transmission path, BS 106 communicates with WD 110 via the wireless interface $U_m$. During forward link transmissions, each BS 106 is capable of transmitting information-bearing signals as well as control signals, such as pilot signals. Pilot signals are used to identify the BS 106 best suited to accommodate reverse link transmissions. Pilot signals also provide a time and coherent phase reference to enable WD 110 to obtain initial system synchronization and facilitate coherent demodulation on the forward link. All pilot signals are subjected to the same PN spreading code but with a different code phase offsets to enable WD 110 to distinguish between different pilot signals, thereby identifying the originating BS 106.

As noted above, proper CDMA system 100 operation requires accurate timing. For example, in accordance with IS-95 and IS-97 standards, each BS 106 is required to use a time base reference from which all time-sensitive transmission components, including pilot PN code sequences and frames, are to be derived. Each BS 106 time base reference is required to be synchronized to CDMA system time. Benefits of synchronized BSs 106 include, for example, improved hand-off speed and reliability, enhanced initial system acquisition (i.e., cell search) speed, increased handset (e.g. WD 110) stand-by time, and improved reliability and power economy due to common channel hand-off operations.

CDMA system time may employ a Global Positioning System (GPS) time base, which may be synchronized with a Universal Coordinated Time (UTC) reference. GPS and UTC may differ by up to a few seconds to compensate for the number of leap year seconds corrections added to UTC since Jan. 6, 1980. BSs 106 are further required to radiate pilot PN code sequences within ±3 μs of CDMA System Time and all CDMA channels radiated by BSs 106 are required to be within ±1 μs of each other. The rate of change for timing corrections may not exceed ⅛ PN chip (101.725 ns) per 200 ms.

Moreover, in accordance with IS-95 and IS-98 standards, each WD 110 is required to use a time base reference used to derive timing for the transmit chip, symbol, frame slot, and system time. During steady-state conditions, each WD 110 is also required to have a timing reference within ±1 μs of the time of the earliest arriving multipath component being used for demodulation, as measured at the WD 110 antenna connector. In addition, if WD 110 time reference correction is needed, then it is to be corrected no faster than ¼ PN chip (203.451 ns) in any 200 ms period and no slower than ⅜ PN chip (305.18 ns) per second.

These stringent timing requirements are necessary because of the interdependence between BS 106 and WD 110 timing. FIG. 2 illustrates the timing relationship at various points within system 100. The start of CDMA System Time is Jan. 6, 1980, 00:00:00 UTC, which corresponds to the start of GPS time, indicated as GPS time stamp zero (GPS TS-0). Because, as noted above, each BS 106 time base reference is to be synchronized to CDMA system time, GPS provides an absolute time reference and each BS 106 transmission includes a GPS time stamp. For convenience, GPS TS-0 will be used heretofore to demonstrate the timing relationships between BS 106 and WD 110.

As indicated in FIG. 2, the interval denoted by reference numeral A1, demonstrates the trailing portions of the PN codes sequences conveyed by the pilot signals transmitted by BS 106 during forward link transmissions, prior to the start of CDMA System Time. The notation $0^{(n)}$ denotes a portion of the PN code sequences, which comprise n consecutive zeros. The initial state of the long PN code sequence is configured with a "1" at the most significant bit (MSB), followed by 41 consecutive "0"s. Similarly, the initial state for both, the I and Q short PN code sequences are configured with a "1" at the MSB, followed by 15 consecutive "0"s.

Interval A2 demonstrates the beginning portions of the pilot PN codes sequences transmitted by BS 106 to WD 110 at GPS TS-0. It is to be noted that BS 106 is synchronized with the absolute time reference provided by GPS in order to transmit pilot signals at exactly 2 second intervals (i.e., even second marks). Even second marks are generally divided into twenty-five 80 ms. periods for CDMA frame boundary timing. Moreover, for the Paging Channel, Forward Traffic Channel, Reverse Traffic Channel, and Access Channel, the 80 ms. period is divided into four 20 ms. frames. For the Sync Channel, the 80 ms. period is divided into three ≈26.66 ms. frames. The pilot PN sequence repeats every ≈26.66 ms. and the ≈26.66 ms. frame boundaries coincide with the pilot PN sequence rollover points, which are offset in the forward CDMA channel to identify the transmitting sector of BS 106.

Interval B3 indicates the reception, by WD 110, of the pilot PN code sequences after a one-way forward link transmission delay ($\Delta_{fl}$). The forward link transmission delay $\Delta_{fl}$ may include delays attributable to the line-of-sight (LOS) propagation delay ($\Delta_{LOS}$) between BS 106 and WD 110, as well as BS 106 and WD 110 processing and hardware delays ($\Delta_{bf}, \Delta_{wf}$, respectively) associated with processing the forward link transmissions.

Interval C3 indicates that WD 110 aligns the timing of the reverse link transmissions with the timing of the received forward link transmissions. This may be achieved by taking into account the well-known forward link processing and hardware delays $\Delta_{wf}$ of WD 110, the well-known reverse link processing and hardware delays $\Delta_{wr}$ of WD 110, and compensating for the delays by advancing the timing of the reverse link transmissions to correspond to the forward link timing at the antenna connector of WD 110.

Finally, interval D4 indicates the reception, by BS 106, of the reverse link signals conveyed by WD 110, after a one-way reverse link transmission delay ($\Delta_{rl}$). The reverse link transmission delay $\Delta_{rl}$ may include delays attributable to the line-of-sight (LOS) propagation delay ($\Delta_{LOS}$) between BS 106 and WD 110, as well as BS 106 and WD 110 processing and hardware delays ($\Delta_{br}, \Delta_{wr}$, respectively) associated with processing the reverse link transmissions.

As noted above, the forward and reverse link WD 110 hardware/processing delays $\Delta_{wf}, \Delta_{wr}$ are generally well-known and stable. In order to ensure that such delays are accounted for, WD 110 may be specifically calibrated in advance for such purposes. However, unlike $\Delta_{wf}, \Delta_{wr}$, BS 106 forward and reverse link hardware/processing delays $\Delta_{bf}, \Delta_{br}$ are subject to change and may be difficult to measure. BSs 106 are not configured identically and, depending on traffic statistics, urban densities, frequent RF tuning, and system resources, each BS 106 may be equipped with a variety of system components, each of which have their own delay characteristics. Unless these delays are calibrated and compensated for, there is no certainty that signals at selected reference points have the requisite timing.

Considerable effort and human resources are required to determine and calibrate the delays due to BS 106 components. In many cases, services may be shut down and numerous technicians may be tasked to adequately assess and effect such calibrations.

Moreover, BSs 106 are frequently being modified and upgraded to provide better service or compensate for faulty equipment. Because each component, as noted above, manifests certain delay characteristics, each modification, whether it be a new cable, a new component, or antenna repositioning, requires the re-assessment and re-calibration of BS 106 delays.

Clearly, BS 106 delay determination and calibration is time and task intensive, requiring substantial economic and manpower resources. Accordingly, what is needed is a system and method for dynamically calibrating base station timing.

SUMMARY OF THE INVENTION

The present invention addresses the need identified above by providing a novel system and method capable of dynamically calibrating base station timing.

System and methods consistent with the principles of the present invention as embodied and broadly described herein include a base station for transmitting, receiving, and processing communication signals and a wireless communication device for communicating with the base station. The wireless communication device is configured to determine its location, to detect an arrival time of a first signal transmitted from the base station, and to calculate a line-of-sight delay corresponding to a line-of-sight distance between the wireless communication device and the base station. The line-of-sight distance is based on the base station location information and the wireless communication device location information. The base station measures a round trip delay corresponding to a delay incurred by the first signal and a delay incurred by a second signal transmitted from the wireless communication device back to the base station in response to the first signal. The base station then determines a base station timing calibration error based on the line-of-sight delay, the first signal arrival time, and the round trip delay, and dynamically calibrates the base station timing to compensate for the base station timing calibration error.

DETAILED DESCRIPTION OF THE INVENTION

The following detailed description refers to the accompanying drawings that illustrate embodiments of the present invention. Other embodiments are possible and modifications may be made to the embodiments without departing from the spirit and scope of the invention. Therefore, the following detailed description is not meant to limit the invention. Rather the scope of the invention is defined by the appended claims.

It will be apparent to one of ordinary skill in the art that the embodiments as described below may be implemented in many different embodiments of software, firmware, and hardware in the entities illustrated in the figures. The actual software code or specialized control hardware used to implement the present invention is not limiting of the present invention. Thus, the operation and behavior of the embodiments will be described without specific reference to the actual software code or specialized hardware components. The absence of such specific references is feasible because it is clearly understood that artisans of ordinary skill would be able to design software and control hardware to implement the embodiments of the present invention based on the description herein.

Moreover, the processes associated with the presented embodiments may be stored in any storage device, such as, for example, non-volatile memory, an optical disk, magnetic tape, or magnetic disk. Furthermore, the processes may be programmed when the system is manufactured or via a computer-readable medium at a later date. Such a medium may include any of the forms listed above with respect to storage devices and may further include, for example, a carrier wave modulated, or otherwise manipulated, to convey instructions that can be read, demodulated/decoded and executed by a computer.

Figure 3A:
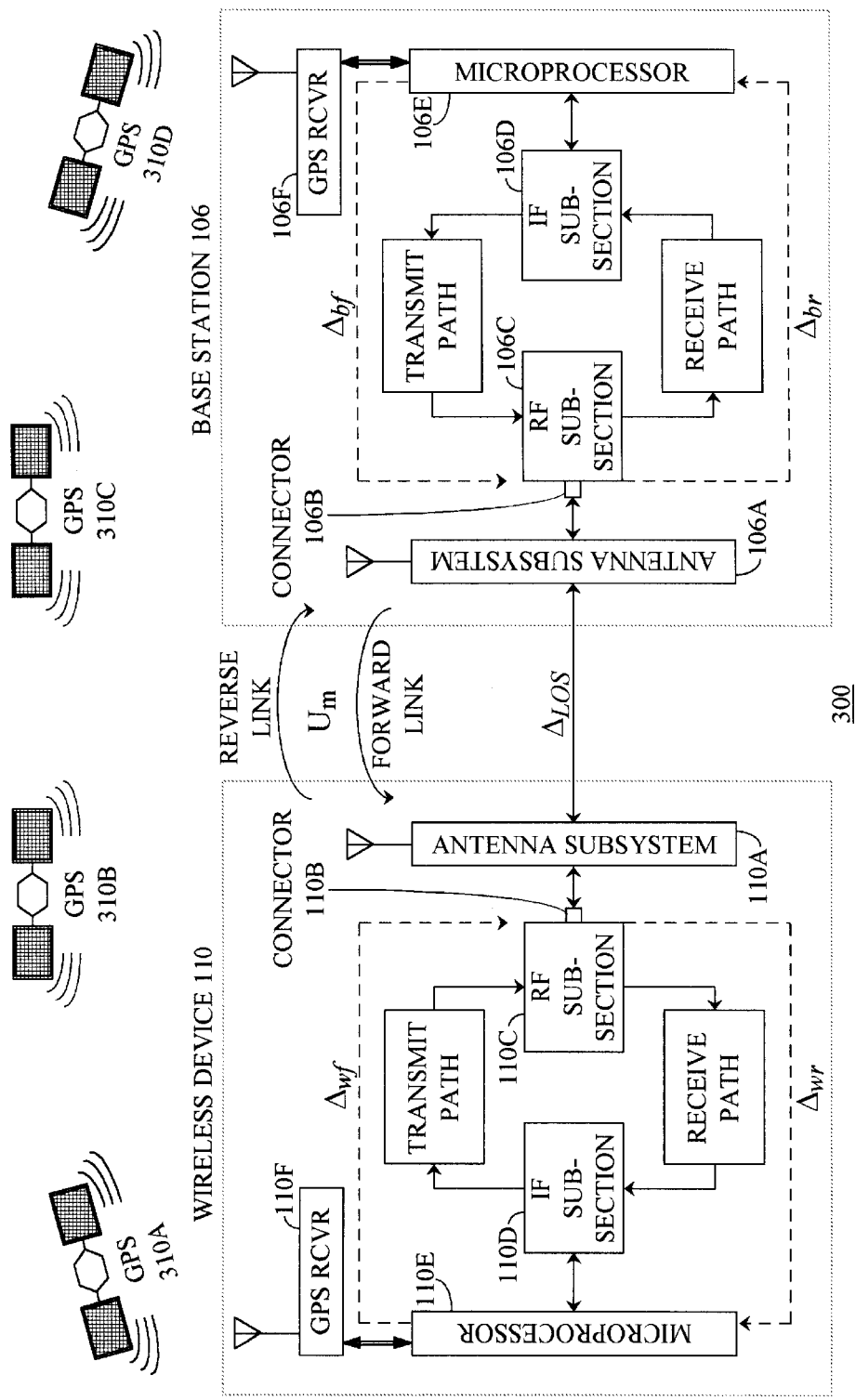
FIG. 3A is a functional block diagram depicting a CDMA wireless communication system capable of base station calibration, constructed and operative in accordance with the present invention.

FIG. 3A is a simplified functional block diagram of CDMA communications system 300, constructed and operative in accordance with an embodiment of the present invention. System 300 comprises BS 106 and WD 110 and is capable of determining the location of a WD 110 and the exact time of day by employing GPS functionality. Such capabilities are well known. For example, one well-known technique includes a GPS-equipped WD 110, which measures the ranges to a plurality of GPS satellites 310A–310B having known locations at the time the measurements are made. Other techniques employ a combination of GPS functionality and a plurality of BSs 106 to triangulate the location of WD 110. Still other techniques for identifying the location of WD 110 have been disclosed, for example, in U.S. Patent Application Nos. 6,058,338 and 6,081,229, commonly owned by the assignee of the present application and herein incorporated by reference.

As indicated in FIG. 3A, WD 110 comprises antenna subsystem 110A for transmitting CDMA signals to, and receiving CDMA signals from, BS 106. Antenna subsystem 110A is coupled to an antenna connector 110B, which serves as the reference point from which WD 110 delays are measured. Antenna connector 110B is coupled to a Radio Frequency (RF) subsection 110C, which is, in turn coupled to an Intermediate Frequency (IF) subsection 110D. As illustrated in FIG. 3A, along the receive path, RF subsection 110C is configured to down-convert the CDMA RF signals received from antenna subsystem 110A and supply the down-converted signals to IF subsection 110D. Conversely, along the transmit path, RF subsection 110C is configured to up-convert the IF signals received from IF subsection 110D and supply the up-converted signals to antenna subsystem 110A for transmission.

IF subsection 110D is coupled to microprocessor 110E, which processes the received IF signals to extract payload information as well as formatting the payload information in a form suitable for IF subsection 110D. Microprocessor 110E is also coupled to a GPS receiver 110F, configured to receive absolute timing information from GPSs 310A–310C in order to determine the exact location of WD 110, as noted above. It will be appreciated that subsections 110C, 110D and GPS receiver 110F may include demodulators, power control devices, filters, deinterleavers, decoders, time/frequency units, and other conventional circuitry that, for the purposes of illustration, have been omitted.

During forward link transmissions, the aggregate forward link WD 110 processing/hardware delay incurred by the respective components along the transmit path is denoted as $\Delta_{wf}$. Similarly, during reverse link transmissions, the aggregate reverse link WD 110 processing/hardware delay incurred by the respective components along the receive path is denoted as $\Delta_{wr}$. WD 110 forward and reverse link delays $\Delta_{wf}$, $\Delta_{wr}$ are known and are typically compensated for. As noted above, WDs 110 may be specifically calibrated in advance to ensure proper WD 110 operation. Because WDs 110 are user-end devices, requiring very little in the way of modifications due to system upgrades, delays $\Delta_{wf}$, $\Delta_{wr}$ are generally stable.

BS 106 comprises antenna subsystem 106A for transmitting CDMA signals to, and receiving CDMA signals from, WD 110. Antenna subsystem 106A is coupled to an antenna connector 106B, which serves as the reference point from which BS 106 delays are measured. As illustrated in FIG. 3A, along the receive path, RF subsection 106C is configured to down-convert the CDMA RF signals received from antenna subsystem 106A and supply the down-converted signals to IF subsection 106D. Conversely, along the transmit path, RF subsection 106C is configured to up-convert the IF signals received from IF subsection 106D and supply the up-converted signals to antenna subsystem 106A for transmission.

IF subsection 106D is coupled to microprocessor 106E, which processes the received IF signals to extract payload information as well as formatting the payload information in a form suitable for IF subsection 106D. Microprocessor 106E is also coupled to a GPS receiver 106F, configured to receive absolute timing information from GPSs 310A–310C in order to generate timing and frequency references for proper CDMA system operation. It will be appreciated that subsections 106C, 106D and GPS receiver 106F may include demodulators, power control devices, filters, deinterleavers, decoders, time/frequency units, and other conventional circuitry that, for the purposes of illustration, have been omitted. Furthermore, BS 106 may include additional functionality to assist in determining the position of WD 110 (i.e., Position Determination Entity (PDE) server mechanism).

During forward link transmissions, the aggregate forward link BS 106 processing/hardware delay incurred by the respective components along the transmit path is denoted as $\Delta_{bf}$. Similarly, during reverse link transmissions, the aggregate reverse link BS 106 processing/hardware delay incurred by the respective components along the receive path is denoted as $\Delta_{br}$.

Figure 3B:
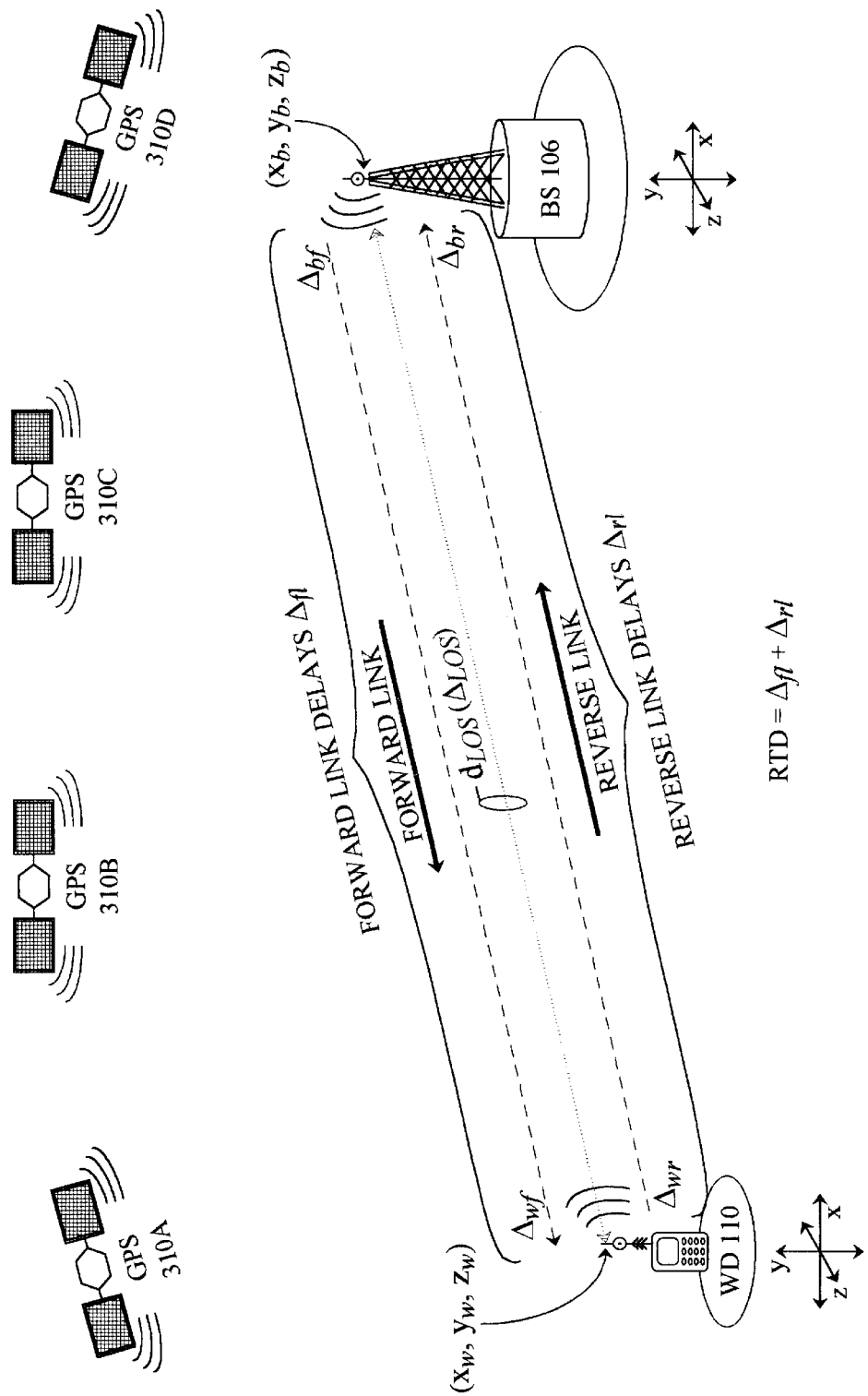
FIG. 3B is a functional diagram illustrating the delay relationships between a base station and a wireless communication device.

FIG. 3B illustrates the relationships between the various delays encountered in system 300. As noted above, system 300 is capable of determining the location of WD 110 (i.e., $X_w$, $Y_w$, and $Z_w$ coordinates). The location of the antenna radiating center of BS 106 (i.e., $X_b$, $Y_b$, and $Z_b$ coordinates) is also known. Therefore, as indicated in FIG. 3B, the LOS distance ($d_{Los}$) between WD 110 and BS 106 may be determined by equation (1):

$$d_{Los} = \overline{(X_b - X_w)^2 + (Y_b - Y_w)^2 + (Z_b - Z_w)^2} \quad (1)$$

Consequently, the LOS delay ALOS incurred by a signal propagating across dLos may be determined by equation (2):

$$\Delta_{LOS} = d_{LOS}/c \quad (2)$$

where c is the speed of light (i.e.~$3 \times 10^8$ m/sec.).

Figure 1:
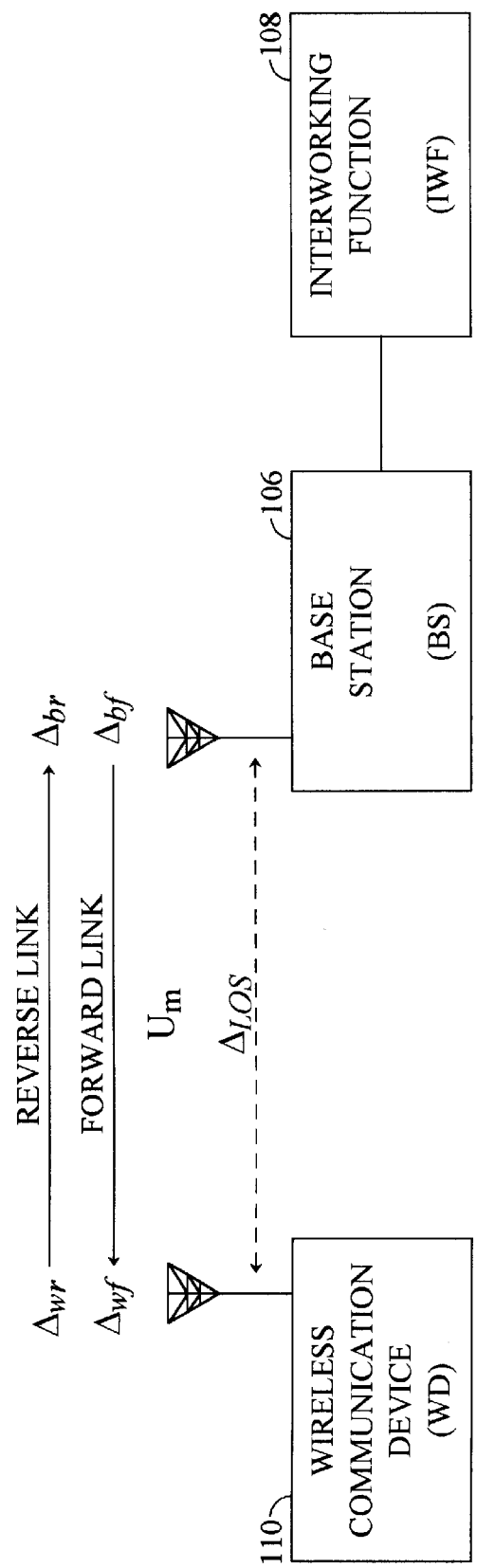
FIG. 1 (Prior Art) is a block diagram illustrating a conventional CDMA wireless communication system.
Figure 2:
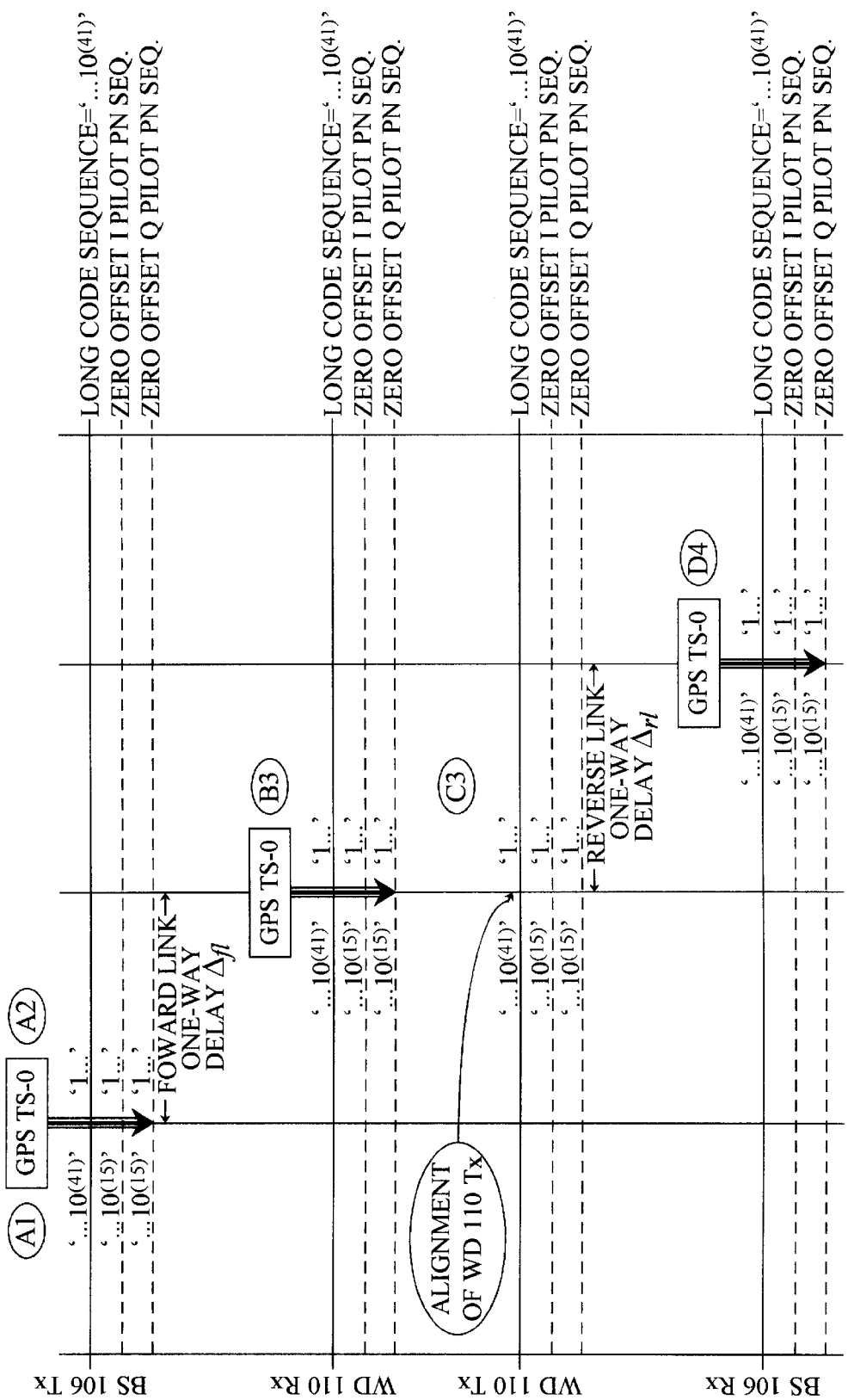
FIG. 2 is a timeline diagram depicting the timing relationships between a base station and a wireless communication device.

As noted above, during forward link transmissions, BS 106 transmits a pilot signal to WD 110, which provides a timing reference. By virtue of its ability to determine its own location and exact time of day, WD 110 is capable of determining $A_{LOS}$ information. In addition, as indicated in FIG. 2, WD 110 exploits the well-known WD 110 forward link hardware/processing delays $\Delta_{wf}$ to align the reverse link transmissions with the forward link transmissions. Therefore, as indicated by FIG. 3B, the one-way forward link transmission delay ($\Delta_{fl}$) detected by WD 110, which represents the total delay encountered in the forward link between BS 106 and WD 110 may be determined by equation (3):

$$\Delta_{fl} = \Delta_{wf} + \Delta_{LOS} + \Delta_{bf} \qquad (3)$$

where: $\Delta_{wf}$ represents the forward link WD 110 hardware/processing delay, $\Delta_{LOS}$ represents the LOS delay, and $\Delta_{bf}$ represents the BS 106 forward link hardware/processing delays due to calibration error. As will be described below, WD 110 is capable of measuring the forward link transmission delay $\Delta_{fl}$ and, by virtue of knowing the WD 110 forward link hardware/processing delays $\Delta_{wf}$ and $\Delta_{LOS}$, it is possible to determine, via equation (3), the value of the BS 106 forward link hardware/processing delays $\Delta_{bf}$.

It is to be noted that, as indicated by FIG. 3B, the one-way reverse link transmission delay ($\Delta_{rl}$), which captures the total delay encountered during the reverse link between WD 110 and BS 106, may be represented by equation (4):

$$\Delta_{rl} = \Delta_{wr} + \Delta_{LOS} + \Delta_{br} \qquad (4)$$

where: $\Delta_{wr}$ represents the reverse link WD 110 hardware/processing delay, $\Delta_{LOS}$ represents the LOS delay, and $\Delta_{br}$ represents the BS 106 reverse link calibration error due to BS 106 hardware/processing delays.

BS 106 is capable of measuring the round trip delay (RTD) encountered by a signal communicated from BS 106 to WD 110 and back to BS 106. In particular, RTD encompasses the delay associated with a signal transmitted from BS 106 to WD 110 and the delay associated with a signal transmitted from WD 110 back to BS 106, in response to the signal received from BS 106. It is to be noted that, as shown in FIG. 2, WD 110 aligns the transmission time of its reverse link transmissions with the arrival time of the received forward link transmissions.

As indicated in FIG. 3B, RTD may be determined by the sum of the one-way forward link delay $\Delta_{fl}$ and the one-way reverse link delay $\Delta_{rl}$. Thus, combining equation (3) with equation (4), yields:

$$RTD = (\Delta_{wf} + \Delta_{LOS} + \Delta_{bf}) + (\Delta_{wr} + \Delta_{LOS} + \Delta_{br}) - BTF \qquad (5)$$

where BTF represents a back-to-the-future counter configured to compensate for WD 110 hardware/processing delays $\Delta_{wf}$ and $\Delta_{wr}$.

Taking into account the reasonable assumption that the well delays $\Delta_{wf}$, $\Delta_{wr}$ are adequately compensated for by the back-to-future counter BTF, equation (5) simplifies to:

$$RTD = \Delta_{LOS} + \Delta_{bf} + \Delta_{LOS} + \Delta_{br} \qquad (6)$$

$$= 2\Delta_{LOS} + (\Delta_{bf} + \Delta_{br})$$

Because LOS delay $\Delta_{LOS}$ is a known quantity, it may be subtracted from both sides of equation (8) to yield:

$$RTD - 2\Delta_{LOS} = \Delta_{bf} + \Delta_{br} \qquad (7)$$

Thus, equation (7) reveals that the difference between the measured RTD and twice the $\Delta_{LOS}$, is the BS 106 calibration error due to the combined forward and reverse link BS 106 hardware/processing delays $\Delta_{bf}$, $\Delta_{br}$. As noted above, by measuring the forward link delay $\Delta_{fl}$ and employing equation (3), it is possible to determine the base station forward link processing delay $\Delta_{bf}$. Thus, to ensure the proper timing of system 300, requires adequately determining forward and reverse link BS 106 calibration errors $\Delta_{bf}$, $\Delta_{br}$, and calibrating BS 106 to compensate for such delays. Conventionally, forward and reverse link BS 106 hardware/processing delays $\Delta_{bf}$, $\Delta_{br}$, are determined by physically measuring these delays, at the expense of system resources. However, as noted above, the BS 106 forward link hardware/processing delays $\Delta_{bf}$ may be determined by measuring the forward link delay $\Delta_{fl}$, factoring in the known values for the WD 110 forward link hardware/processing delays $\Delta_{wf}$ and $\Delta_{LOS}$, and using equation (3) to solve for $\Delta_{bf}$.

Moreover, as noted above, BS 106 is synchronized with the absolute time reference provided by GPS satellites 310A–310D in order to transmit pilot signals with rollover points that correspond to the ~26.66 ms. frame boundaries. In addition, the signals received by WD 110 may be time stamped with the absolute time reference provided by GPS satellites 310A–310D so as to identify when the signals were received. Thus, the arrival time of pilot signals ($\tau_{arr}$) are known. Furthermore, because pilot signals are initiated by BS 106 during forward link transmissions, pilot signal arrival times $\tau_{arr}$ are functions of the forward link delays, in accordance with equation (3). Specifically, $$\tau_{arr} = \Delta_{wf} + \Delta_{LOS} + \Delta_{bf} \qquad (8)$$

Because the pilot signal arrival time $\tau_{arr}$, the forward link WD 110 hardware/processing delay $\Delta_{wf}$, and the LOS delay $\Delta_{LOS}$ are known at WD 110, the forward link BS 106 calibration error $\Delta_{bf}$ may be calculated, as indicated by equation (9):

$$\Delta_{bf} = \tau_{arr} - \Delta_{wf} - \Delta_{LOS} \qquad (9)$$

Therefore, the forward link BS 106 calibration error $\Delta_{bf}$ may be determined by detecting the pilot signal arrival time $\tau_{arr}$, and subtracting from it the known forward link WD 110 hardware/processing delay $\Delta_{wf}$ and the LOS delay $\Delta_{LOS}$. As such, during forward link calibrations, BS 106 may be calibrated by first determining the forward link BS 106 calibration error $\Delta_{bf}$ based on equation (9) and then compensating for error $\Delta_{bf}$ by adjusting the transmission processing time of a transmitted signal, accordingly.

Moreover, because the measured RTD is a function of both, the forward link BS 106 calibration error $\Delta_{bf}$ and the reverse link BS 106 calibration error $\Delta_{br}$, in view of the above, reverse link calibration error $\Delta_{bf}$ may also be determined. In particular, rewriting equation (7) to include the calculated forward link BS 106 calibration error $\Delta_{bf}$ set forth by equation (9) yields:

$$RTD - 2\Delta_{LOS} = (\tau_{arr} - \Delta_{wf} - \Delta_{LOS}) + \Delta_{br} \qquad (10)$$

Solving for the reverse link BS 106 calibration error $\Delta_{br}$ yields:

$$\Delta_{br} = RTD - 2\Delta_{LOS} - (\tau_{arr} - \Delta_{wf} - \Delta_{LOS}) = RTD + \Delta_{wf} - \tau_{arr} - \Delta_{LOS} \qquad (11)$$

Therefore, the reverse link BS 106 calibration error $\Delta_{br}$ may be determined subtracting from the measured RTD and known forward link WD 110 hardware/processing delay $\Delta_{wf}$, the known pilot signal arrival time $\tau_{arr}$ and the known LOS delay $\Delta_{LOS}$. As such, during reverse link calibrations, BS 106 may be calibrated by measuring both, RTD and pilot arrival time $\tau_{arr}$, and then calculating the reverse link BS 106 calibration error $\Delta_{br}$ based on equation (11).

Figure 3C:
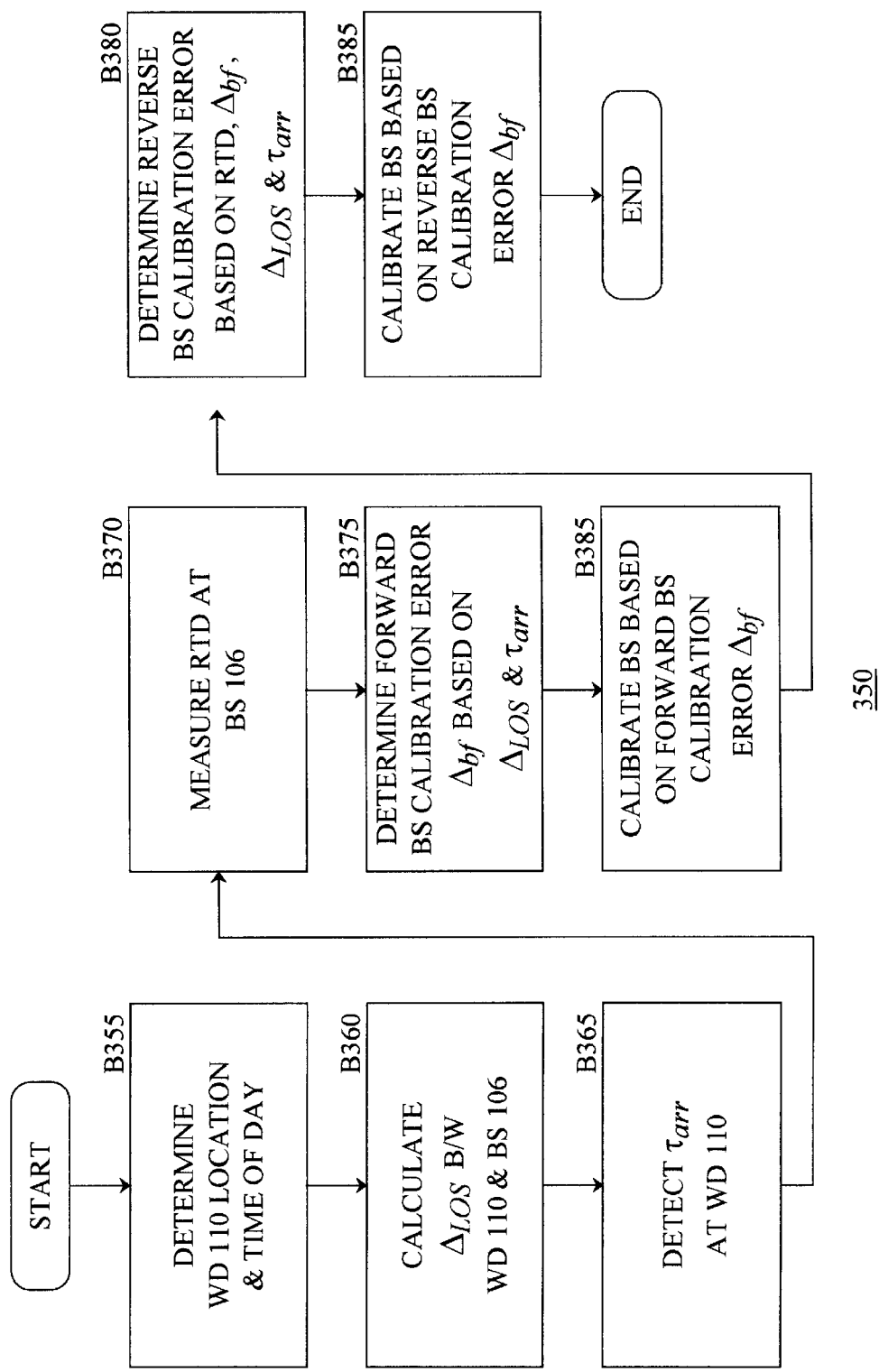
FIG. 3C is a flow-chart illustrating a process for calibrating a base station, constructed and operative in accordance with another embodiment of the present invention.

FIG. 3C is a flowchart illustrating process 350, constructed and operative in accordance with another embodiment of the present invention. Process 350 is configured to calibrate BS 106, based on WD 110 and BS 106 location information.

As indicated in block B355, process 350 determines the location of WD 110 as well as the exact time of day. As noted above, the location of WD 110 may be determined by well-known means, such as, for example, equipping WD 110 with GPS functionality.

In block B360, process 350 determines LOS delay $\Delta_{LOS}$ incurred by a signal propagating between BS 106 and WD 110. As noted above in equations (1) and (2), LOS delay $\Delta_{LOS}$ is a function of the distance $d_{LOS}$ between the BS 106 antenna radiating center location (i.e., $X_b$, $Y_b$, and $Z_b$ coordinates) and the WD 110 location (i.e., $x_w$, $y_w$, and $Z_w$ coordinates).

In block B365, process 350 detects the WD 110 arrival time $\tau_{arr}$ of a pilot signal transmitted by BS 106. The pilot signal arrival time $\tau_{arr}$ is identified by WD 110 via the absolute time reference information provided by GPS satellites 310A–310D.

In block B370, process 350 measures the RTD encompassing the delay incurred by a first signal transmitted from BS 106 to WD 110 and the delay incurred by a second signal transmitted from WD 110 back to BS 106, in response to the first signal.

In block B375, process 350 determines the forward BS timing calibration error $\Delta_{bf}$ based on $\Delta_{LOS}$ and $\tau_{arr}$. Specifically, process 350 determines the forward BS timing calibration error $\Delta_{bf}$ in accordance with equation (9). Accordingly, in block B380, process 350 calibrates BS 106 by adjusting the transmission processing time of forward link transmissions in order to compensate for the forward BS timing calibration error $\Delta_{bf}$.

In block B385, process 350 determines the reverse BS timing calibration error $\Delta_{br}$ based on $\Delta_{bf}$, $\Delta_{LOS}$, and $\tau_{arr}$. Specifically, process 350 determines the reverse BS timing calibration error $\Delta_{br}$ in accordance with equation (11). Accordingly, in block B385, process 350 calibrates BS 106 by adjusting the receive processing time of reverse link transmissions in order to compensate for the reverse BS timing calibration error $\Delta_{br}$.

The foregoing description of the preferred embodiments is provided to enable any person skilled in the art to make or use the present invention. Various modifications to these embodiments are possible, and the generic principles presented herein may be applied to other embodiments as well. For example, certain base stations may lack access to an absolute time reference. In such cases, the base station delays due to the forward link calibration error may contain an additional time offset, representative of the difference between the base station internal clock and an external absolute time reference. By simply combining the forward link calibration error and additional time offset, the base station timing may still be calibrated in accordance with the above-described embodiments.

Moreover, the invention may be implemented in part or in whole as a hardwired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit.

As such, the present invention is not intended to be limited to the embodiments shown above but rather is to be accorded the widest scope consistent with the principles and novel features disclosed in any fashion herein.

What is claimed is:

1. A method for calibrating timing of base station in a wireless communication system, comprising:

determining location information of a wireless communication device;

calculating a line-of-sight delay corresponding to a line-of-sight distance between said wireless communication device and said base station, said line-of-sight distance based on base station location information and said wireless communication device location information;

detecting an arrival time of a first signal transmitted from said base station to said wireless communication device;

measuring a round trip delay corresponding to a delay incurred by said first signal and a delay incurred by a second signal transmitted from said wireless communication device back to said base station in response to said first signal;

determining a base station timing calibration error based on said line-of-sight delay, said first signal arrival time, and said round trip delay; and calibrating said base station timing to compensate for said base station timing calibration error; wherein said line-of-sight delay is determined by the following relationship:

$$\Delta_{los} = \frac{\sqrt{(x_b - x_w)^2 + (y_b - y_w)^2 + (z_b - z_w)^2}}{c}$$

where: $\Delta_{los}$ represents the line-of-sight delay, $x_b$, $y_b$, and $Z_b$ represent coordinate information identifying the base station location information, $x_w$, $y_w$, $z_w$ represent coordinate information identifying the wireless communication device location information, and c represents the speed of light.

2. The method of claim 1, wherein said determining base station timing calibration error includes determining a forward link base station calibration timing error based on said first signal arrival time, said line-of-sight delay, and a wireless communication device processing delay.

3. The method of claim 2, wherein said determining base station timing calibration error further includes determining a reverse link base station calibration timing error based on said round trip delay, said first signal arrival time, said line-of-sight delay, and said wireless communication device processing delay.

4. The method of claim 3, wherein said forward link base station calibration timing error is determined by the following relationship: $\Delta_{bf} = \tau_{arr} - \Delta_{wf} - \Delta_{LOS}$, where: $\Delta_{bf}$ represents the forward link base station calibration timing error, $\Delta_{wf}$ represents the wireless communication device processing delay, $\tau_{arr}$ represents the first signal arrival time, and $\Delta_{LOS}$ represents the line-of-sight delay.

5. The method of claim 4, wherein said reverse link base station calibration timing error is determined by the following relationship: $\Delta_{br} = =RTD + \Delta_{wf} - \tau_{arr} - \Delta_{LOS}$, where: $\Delta_{br}$ represents the reverse link base station calibration timing error, RTD represents the round trip delay, $\Delta_{wf}$ represents the wireless communication device processing delay, $\Delta_{arr}$ represents the first signal arrival time, and $\Delta_{LOS}$ represents the line-of-sight delay.

6. The method of claim 5, wherein said measuring round-trip delay further includes, measuring a plurality of delays corresponding to a plurality of first signals transmitted from said base station to said wireless communication device and a plurality of second signals transmitted from said wireless communication device to said base station, in response to said first signals, and averaging said plurality of delays to determine said round trip delay.

7. The method of claim 6, wherein said calibrating base station timing to compensate for said base station timing calibration error includes adjusting a transmission time for signals transmitted from said base station to said wireless communication device by an amount equivalent to said forward link base station calibration timing error.

8. The method of claim 7, wherein said calibrating base station timing to compensate for said base station timing calibration error further includes adjusting a reception time for signals transmitted from said wireless communication device to said base station by an amount equivalent to said reverse link base station calibration timing error.

9. The method of claim 8, wherein said determining location information of said wireless communication device includes employing a global positioning satellite mechanism in said wireless communication device, said global positioning satellite mechanism configured to receive timing and frequency information from a plurality of participating satellites and to determine its location based on said timing and frequency information.

10. A system for calibrating base station timing in a wireless communication system, comprising:

a base station for transmitting, receiving, and processing communication signals; and a wireless communication device for communicating with said base station, said wireless communication device configured to determine its location, to detect an arrival time of a first signal transmitted from said base station, and to calculate a line-of-sight delay corresponding to a line-of-sight distance between said wireless communication device and said base station, said line-of-sight distance based on base station location information and said wireless communication device location information, wherein said base station measures a round trip delay corresponding to a delay incurred by said first signal and a delay incurred by a second signal transmitted from said wireless communication device back to said base station in response to said first signal, and wherein said base station determines a base station timing calibration error based on said line-of-sight delay, said first signal arrival time, and said round trip delay, and calibrates said base station timing to compensate for said base station timing calibration error;

wherein said line-of-sight delay is determined by the following relationship:

$$\Delta_{los} = \frac{\sqrt{(x_b - x_w)^2 + (y_b - y_w)^2 + (z_b - z_w)^2}}{c}$$

where: $\Delta_{los}$ represents the line-of-sight delay, $x_b$, $y_b$, and $z_b$ represent coordinate information identifying the base station location information, $x_w$, $y_w$, $z_q$ represent coordinate information identifying the wireless communication device location information, and c represents the speed of light.

11. The system of claim 10, said base station timing calibration error includes g a forward link base station calibration timing error based on said first signal arrival time, said line-of-sight delay, and a wireless communication device processing delay.

12. The system of claim 11, wherein said base station timing calibration error further includes a reverse link base station calibration timing error based on said round trip delay, said first signal arrival time, said line-of-sight delay, and said wireless communication device processing delay.

13. The system of claim 12, wherein said forward link base station calibration timing error is determined by the following relationship: $\Delta_{bf} = \tau_{arr} - \Delta_{wf} - \Delta_{LOS}$, where: $\Delta_{bf}$ represents the forward link base station calibration timing error, $\Delta_{wf}$ represents the wireless communication device processing delay, parrrepresents the first signal arrival time, and $\Delta_{LOS}$ represents the line-of-sight delay.

14. The system of claim 13, wherein said reverse link base station calibration timing error is determined by the following relationship: $\Delta_{br} == RTD + A_{wf} - \tau_{arr} - \Delta_{LOS}$, where: $\Delta_{br}$ represents the reverse link base station calibration timing error, RTD represents the round trip delay, $\Delta_{wf}$ represents the wireless communication device processing delay, $E_{arr}$ represents the first signal arrival time, and $\Delta_{LOS}$ represents the line-of-sight delay.

15. The system of claim 14, wherein said round-trip delay includes an average of a plurality of delays corresponding to a plurality of first signals transmitted from said base station to said wireless communication device and a plurality of second signals, responsive to said first signals, transmitted from said wireless communication device to said base station.

16. The system of claim 15, wherein said base station calibrates said base station timing by adjusting a transmission time for signals transmitted from said base station to said wireless communication device by an amount equivalent to said forward link base station calibration timing error.

17. The system of claim 16, wherein said when in said base station calibrates said base station timing by adjusting a reception time for signals transmitted from said wireless communication device to said base station by an amount equivalent to said reverse link base station calibration timing error.

18. The system of claim 17, wherein said wireless communication device determines said wireless communication device location information by employing a global positioning satellite mechanism, said global positioning satellite mechanism configured to receive timing and frequency information from a plurality of participating satellites and to determine its location based on said timing and frequency information.

19. A machine-readable medium encoded with a plurality of processor-executable instruction sequences for calibrating timing of a base station in a wireless communication system, said instruction sequences comprising:

determining location information of a wireless communication device;

calculating a line-of-sight delay corresponding to a line-of-sight distance between said wireless communication device and said base station, said line-of-sight distance based on base station location information and said wireless communication device location information;

detecting an arrival time of a first signal transmitted from aid base station to said wireless communication device;

measuring a round trip delay corresponding to a delay incurred by said first signal and a delay incurred by a second signal transmitted from said wireless communication device back to said base station in response to said first signal; determining a base station timing calibration error based on said line-of-sight delay, said first signal arrival time, and said round trip delay; and calibrating said base station timing to compensate for said base station timing calibration error;

wherein said line-of-sight delay is determined by the following relationship:

$$\Delta_{los} = \frac{\sqrt{(x_b - x_w)^2 + (y_b - y_w)^2 + (z_b - z_w)^2}}{c}$$

where: $\Delta_{los}$ represents the line-of-sight delay, $x_b$, $y_b$ and $z_b$ represent coordinate information identifying the base station location information, $x_w$, $x_w$, $z_q$ represent coordinate information identifying th wireless communication device location information, and c represents the speed of light.

20. The machine-readable medium of claim 19, wherein said determining base station timing calibration error includes determining a forward link base station calibration timing error based on said first signal arrival time, said line-of-sight delay, and a wireless communication device processing delay.

21. The machine-readable medium of claim 20, wherein said determining base station timing calibration error further includes determining a reverse link base station calibration timing error based on said round trip delay, said first signal arrival time, said line-of-sight delay, and said wireless communication device processing delay.

22. The machine-readable medium of claim 21, wherein said forward link base station calibration timing error is determined by the following relationship: $\Delta_{bf}=\tau_{arr}-\Delta_{wf}-\Delta_{LOS}$, where: $\Delta_{bf}$ represents the forward link base station calibration timing error, $\Delta_{wf}$ represents the wireless communication device processing delay, $\tau_{arr}$ represents the first signal arrival time, and $\Delta_{LOS}$ represents the line-of-sight delay.

23. The machine-readable medium of claim 22, herein said reverse link base station calibration timing error is determined by the following relationship:

$\Delta br = RTD + \Delta_{wf} - \Sigma_{arr} - \Delta_{LOS}$, where: $\Delta_{br}$ represents the reverse link base station calibration timing error, RTD represents the round trip delay, $\Delta_{wf}$ represents the wireless communication device processing delay, $\tau_{arr}$ represents the first signal arrival time, and $\Delta_{LOS}$ represents the line-of-sight delay.

24. The machine-readable medium of claim 23, wherein said measuring round-trip delay further includes, measuring a plurality of delays corresponding to a plurality of first signals transmitted from said base station to said wireless communication device and a plurality of second signals transmitted from said wireless communication device to said base station, in response to said first signals, and averaging said plurality of delays to determine said round trip lay.

25. The machine-readable medium of claim wherein said calibrating base station timing to compensate for said base station timing calibration error includes adjusting a transmission time for signals transmitted from said base station to said wireless communication device by an amount equivalent to said forward link base station calibration timing error.

26. The machine-readable medium of claim 25, wherein said calibrating base station timing to compensate for said base station timing calibration error further includes adjusting a reception time for signals transmitted from said wireless communication device to said base station by an amount equivalent to said reverse link base station calibration timing error.

27. The machine-readable medium of claim 26, wherein said determining location information of said wireless communication device includes employing a global positioning satellite mechanism in said wireless communication device, said global positioning satellite mechanism configured to receive timing and frequency information from a plurality of participating satellites and to determine its location based o said timing and frequency information.

\* \* \* \* \*

UNITED STATES PATENT AND TRADEMARK OFFICE
CERTIFICATE OF CORRECTION

PATENT NO. : 6,687,501 B1
DATED : February 3, 2004
INVENTOR(S) : Samir S. Soliman It is certified that error appears in the above-identified patent and that said Letters Patent is hereby corrected as shown below:

Column 10,
Line 64, "= =" should read -- = --.

Column 11,
Line 3, "$\Delta_{arr}$" should read -- $\tau_{arr}$ --.

Column 12,
Line 7, should read -- 11. The system of claim 10, wherein said base station timing --.
Line 8, should read -- Calibration error includes a forward link base station --.
Line 25, "parrepresents" should read -- $\tau_{arr}$ represents --.
Line 28, "= =" should read -- = --.
Line 34, "$\Delta_{wf}$" should read -- $A_{wf}$ --.
Line 35, "$E_{arr}$" should read -- $\tau_{arr}$ --.
Line 50, cancel "when in said".

Column 14,
Line 5, cancel "herein" and replace with -- wherein --.
Line 8, "$\Delta$br" should read -- $\Delta_{br}$ --;
Line 8, "$\Sigma_{arr}$" should read -- $\tau_{arr}$ --.
Line 24, cancel "lay" and replace with -- delay --.
Line 25, should read -- 25. The machine-readable medium of claim 19, wherein said --.

Signed and Sealed this

Tenth Day of January, 2006

JON W. DUDAS
*Director of the United States Patent and Trademark Office*